United States Patent [19]

Brase

[11] 3,739,739

[45] June 19, 1973

[54] INSTRUMENT FOR ISOLATING ROWS OF PRINTED MATTER FOR READING

[76] Inventor: Roy J. Brase, 20563 Yeandle Street, Castro Valley, Calif. 94546

[22] Filed: Aug. 24, 1972

[21] Appl. No.: 283,276

[52] U.S. Cl. .......................... 116/119, 35/2, 40/352, 281/42, 283/65

[51] Int. Cl. .......................... B42d 9/00

[58] Field of Search .......................... 116/114, 119, 135; 35/2; 40/352; 281/42, 45; 283/65

[56] References Cited

UNITED STATES PATENTS

| | | | |
|---|---|---|---|
| 1,353,279 | 9/1920 | Schulthess | 40/352 X |
| 1,658,499 | 2/1928 | Stevens | 116/119 |
| 3,114,552 | 12/1963 | Flower | 40/352 X |
| 3,126,862 | 3/1964 | Hanley | 116/119 |
| 3,269,752 | 8/1966 | Lindaman | 283/65 |
| 3,408,977 | 11/1968 | Colman, Jr. | 116/119 |

*Primary Examiner*—Louis J. Capozi

*Attorney*—Mark Mohler, Dirk B. Foster, Bruce W. Schwab

[57] ABSTRACT

An instrument for use in quickly and accurately isolating each of separate straight lines of printed symbols such as letters or numerals or both, and increasing their clarity for reading in which a pair of parallel, spaced strips or lines midway between the opposite planar sides of flexible transparent material is positioned to define an elongated, clear, colorless, transparent band in the strip between said lines within which the printed symbols of one of said lines of printing are isolated for reading when said instrument is laid flat on the sheet with the line of printed symbols to be examined positioned between said straight lines of said pair.

4 Claims, 8 Drawing Figures

INSTRUMENT FOR ISOLATING ROWS OF PRINTED MATTER FOR READING

SUMMARY

One of the most costly and serious problems in checking for errors in printouts from computers, is the erroneous readings made from the examination of the printouts, which work is performed by persons skilled in such work. Also, in other instances where lines of printed matter include identity-defining indicia essential to the operation of a system, such as in a telephone exchange where operators are assigned to provide callers with telephone numbers, speed and accuracy in locating and giving the correct number are essential to the success of the system.

Heretofore masks have been employed for sliding over a sheet of printed material to block out printed matter, except that of the line. One of the main objections to this type of device has been the difficulty of locating the desired line, due to obscuring the reference material in the lines adjacent to, and above and below the printing material in the line to be examined. This obscuring of the adjacent lines has been found, in many instances to result in an unconscious confusion in the mind of the examiner between a digit in a number having a plurality of digits, particularly where the digits in numbers above ad below the one in the line to be examined are alike and in the same order except for one of the digits.

Other attempts have been made to facilitate the isolation of lines for accuracy in isolating a line of printed material from that in other lines equally spaced from each other in columns, such as the formation of a slot through which the line to be examined is exposed, but here again the devices have substantially ignored the importance of so isolating the desired line as to quickly insure accuracy in the isolation of the line without impairing the visible legibility of the printed matter in the other lines in the column, that are above and below the line to be examined.

More recently the manufacturers of the computer forms have attempted, as a solution to erroneous reading of the printouts, continuous strip forms having spaced bands imprinted thereon in each of which a plurality of rows of matter is to be imprinted. The added costs of providing such forms in the quantity used is substantial, but the errors continue as there is no clear isolation of one row from adjacent rows.

In extended tests made in industries where errors have heretofore occurred, in as much as 15% of the readings of printed numerals in columns, due to confusion between printed matter in adjacent lines in columns, the use of the instrument herein described has virtually reduced the number to zero, and has resulted in substantially accelerating the locating and reading operations.

One of the objects of the invention is the provision of an instrument in the form of a strip of flexible, transparent material of uniform thickness having continuous, planar opposite surfaces, either of which is adapted to be positioned against a sheet having rows of printed matter, and which sheet is formed to provide a crystal clear band extending longitudinally of said strip and spaced from and parallel with one of the longitudinally extending edges of said strip with the areas extending away from said band being transparent and of a characteristic clearly distinguishing them from the crystal clear characteristic of said band, for isolating a row of said printed matter on such sheet from the rows adjacent thereto.

Another object of the invention is the provision of an instrument as described in the foregoing object, in which the characteristics distinguishing said areas from the characteristic of the band are disposed within said strip spaced from said planar opposite surfaces.

A still further object of the invention is the provision of an instrument as described in the foregoing objects, in which said areas of distinguishing characteristics include a pair of parallel stripes of a substantially darker hue than that of the remainder of said areas to clearly isolate said band from said remainder of said areas.

Other objects and advantages will appear in the description and drawings.

DETAILED DESCRIPTION

Figure 1:
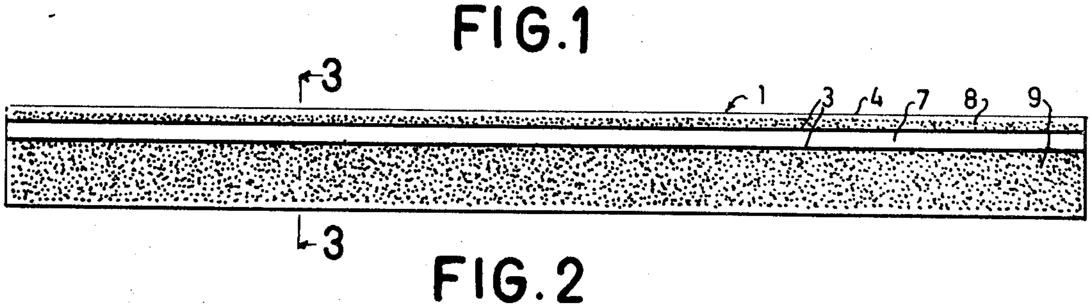
FIG. 1 is a plan view of the instrument.
Figure 2:
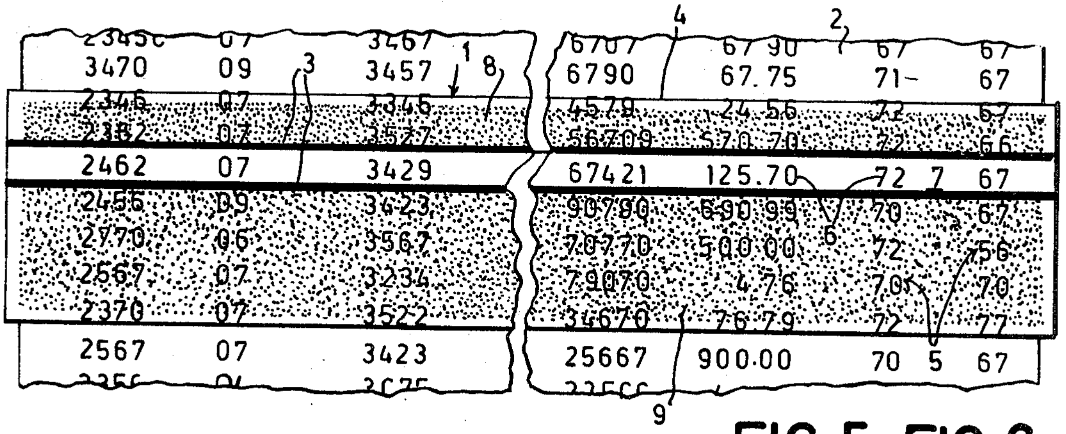
FIG. 2 is an enlarged plan view of the instrument, broken in length to accomodate it to the sheet, and shown in a position over a portion of a computer printout.

The instrument shown in FIGS. 1 to 4 is primarily designed for use in checking computer printouts, as shown in FIG. 2 in which letters or numerals are printed from pica size type such as in computer printouts and standard typewritten material, although this is not to be considered a limitation. The body of said instrument is a strip 1, preferably slightly longer than fifteen inches so as to extend the full width of a conventional printout sheet 2 (FIG. 2) with the ends of the strip projecting from the two opposite edges of said sheet. This enables the operator to engage the end edges of the strip with one or more fingers of the hands for moving the instrument up and down the sheet 2 longitudinally of the columns of figures on the sheet, without touching or disturbing the sheet.

The longitudinally extending edges of strip 1 are parallel, and the thickness of the latter is preferably about approximately one thirtieth of an inch.

Fully enclosed within the body of the strip 1, and preferably midway between its two opposite planar surfaces, is imprinted or formed, a pair of transparent spaced stripes 3 that are parallel with and spaced for one longitudinally extending edge 4 of the strip 1. Said stripes preferably extend substantially from end to end of the strip. The spacing between said stripes 3 may be slightly greater than the height of pica size numerals or letters. Such letters and numerals and also other printed material may be grouped under the general designation of "symbols." Preferably said stripes 3 are each approximately a fifth of an inch apart. The pica size lettering is approximately one tenth of an inch in height. The spacing between the rows of symbols 5 in each of the columns of figures in a conventional printout is approximately one twentieth. Thus the specific symbols, designated 6 on sheet 2 underneath the band 7 between stripes 3 will be clearly isolated from the symbols 5 in the areas at opposite sides of and extending away from the pair of stripes 3.

The pair of stripes 3 is relatively close to the longitudinally extending edge 4 of the strip 1, preferably the area 8 between the pair of stripes 3 and edge 4 will extend substantially over a pair of rows of printed symbols on sheet 1 that are adjacent to the row of symbols 5.

The area 9 between the pair of stripes 3 and the longitudinally extending edge 10 of strip 1 that is opposite edge 4 is preferably relatively wide relative to the width of area 8, and may extend over approximately four adjacent rows of symbols 5 that are at the side of said pair of stripes 3 opposite to area 8.

In use, many operators prefer to engage the upper surface of the portion of strip 1 at area 9 with the fingers of a hand for sliding the strip up and down on sheet 2 over the columns of symbols, and the wider area 9 enables this to be done without interfering with reading the symbols seen through band 7.

The stripes 3 may be in a solid color that is transparent, but dark, compared with the crystal clear band 7 or with the areas 8, 9.

The areas 8, 9 are lightly tinted so as to be almost indistinguishable from the band 7 between stripes 3 until positioned against the sheet 2, when the tint, which preferably has a bluish cast, is clearly distinguishable from the clear band 7.

This relationship between the color values of the stripes 3 and that of areas 8, 9 is quite important in that the symbols 5 that are below the tinted areas 8, 9 may be clearly read and are not obscured by stripes 3, and the dark color value of stripes 3 unmistakeably isolates the symbols 6 below band 7 from the symbols 5 that are in adjacent rows.

The clarity of symbols 6 is substantially magnified by the depth of value of stripes 3 compared to the value of the sheet 2 on which the symbols are printed, whether the surface of sheet 2 is white or tinted.

It is important that none of the symbols 5, 6 be distorted by the instrument, and that all are clear, enable the operator to use the symbols 5 as a reference for quickly and accurately locating the row of symbols to be examined below band 7. In many computer printouts, the names of persons and words that are associated with numerals are used. The sheet 2 is only one example.

The flexibility of strip 1 is highly desirable to enable the operator to use only a portion of the instrument, if desired. This is done by grasping one end 11 (FIG. 4) of the strip and laying the opposite end 12 against the sheet 2, the latter being supported on a flat surface. Thus end 11 may be flexed upwardly into the grasping hand while the reading may be taken through portion 12.

Figures 3, 4, 5, 6:
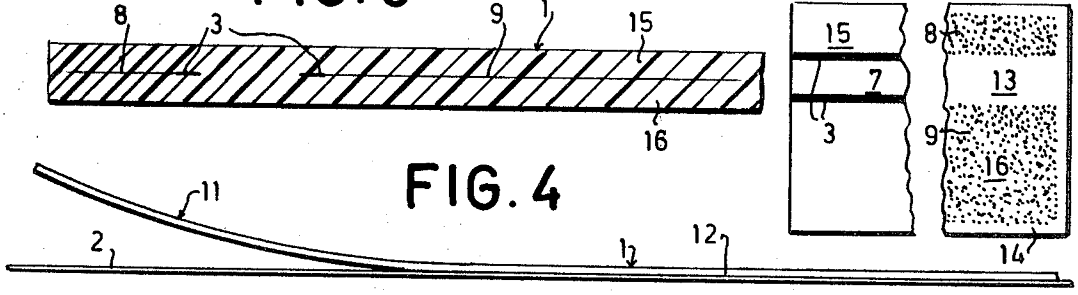
FIG. 3 is a greatly enlarged cross-sectional view along line 3—3 of FIG. 1.
FIG. 4 is a side elevational view of the instrument of FIG. 1 showing one end portion flexed upwardly as it would be if manually flexed by a hand grasping the flexed end and pressing the remainder against a sheet.
FIG. 5 is a fragmentary view of the inner surface of one of the laminae forming half of the body of the instrument.
FIG. 6 is a fragmentary view of the inner surface of the other laminae to be bonded with the surface shown in FIG. 5, to form the instrument.

Referring to FIG. 3, which is many times enlarged and is taken along line 3—3 of FIG. 1, the stripes 3 are indicated by the short heavier lines and the tinting for areas 8, 9 are indicated by the thin line that is substantially coplanar with stripes 3.

The strip 1 is preferably laminated, comprising elongated lamina 15, 16.

In (FIGS. 3, 5, 6) each is one half the thickness of the strip 1.

The stripes 3 are printed on one face of the half 15 that is to be joined to the half 16 (FIG. 5) while the tints of areas 8, 9 (FIG. 6) are imprinted on the face of half 16 that is to be joined to half 15, leaving an untinted marginal portion 14 about one sixteenth of an inch along each edge of the half 16, and leaving the space between said areas untinted as seen at 13.

The imprinted surfaces are then positioned together and the halves united under heat and pressure providing an integral body with the stripes and tints centrally between opposite sides of the strip.

With this structure the instrument may be positioned with either of its opposite surfaces against the sheet 2 having the printed rows of symbols to be read without changing or impairing visibility of the printing below band 7. Also there will be no impairment of the stripes 3 and the tinted areas 8, 9 due to repeated sliding of the instrument in reading operations.

The finished instrument is virtually a unitary body with the lamina inseparably bonded together.

Figure 7:
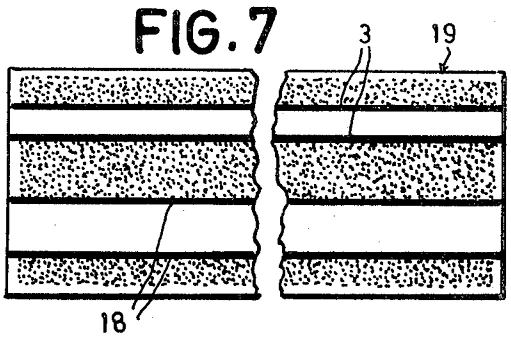
FIG. 7 is a modification of the instrument shown in FIGS. 1–4, showing two pairs of stripes for use in isolating single spaced rows of printed matter, or double spaced rows.

FIG. 7 shows a modification of the instrument of FIGS. 1–6 in that a second pair of spaced stripes 18 is provided in a slightly wider strip generally designated 19. The spacing between stripes 18 provides a wider clear band to enable rapid proofreading or examination of double-spaced rows of printing, instead of single-spaced rows. Otherwise the structure is the same as described for the strip of FIGS. 1–6, with stripes 3 providing for isolating single space rows of printing.

Figure 8:
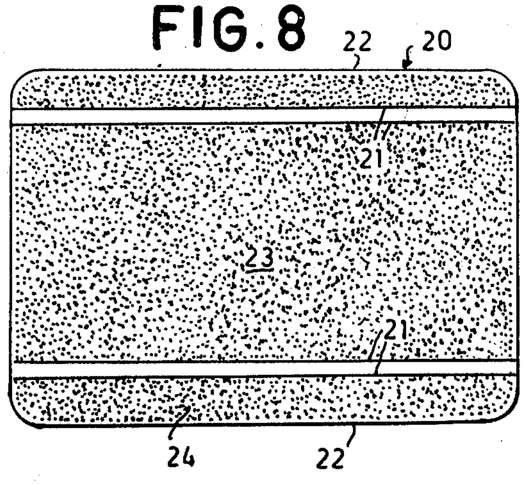
FIG. 8 is a full size plan view of a thin strip particularly adapted for use in isolating a row of printed matter in a telephone directory from adjacent rows.

FIG. 8 shows in actual size a very thin, flexible strip 20 of several thousandths of an inch in thickness formed from a pair of lamina of paper-like thinness.

This instrument was primarily designed for use by telephone exchange operators, and others, for quickly and accurately isolating names and numbers of telephone subscribers in the telephone books.

A pair of printed stripes 21 is adjacent but spaced from each of two opposite longitudinally extending edges 21 of the strip 20. The relatively large area 23 between the two pairs of stripes 21 and the narrow areas 24 between said pairs and edges 22 are tinted. The difference in the tinting of stripes 21 and that of areas 23, 24 may be the same as between the pairs of stripes 3 and the tinted areas 8, 9. The stripes 21 are each relatively narrow compared to the width of stripes 3.

In use the operator normally flexes the strip by laying one of the sets of printed stripes 21 over the portion of the printed matter to be isolated while holding the remaining portion of the strip between the fingers of the band.

The grip on the strip 20 may be quickly shifted for moving the strip 20 upward or downwardly on the printed page. In either case a pair of stripes 21 will be adjacent the leading edge.

In telephone directories the lines of printed matter are quite close together, and small type is used, which results in many wrong numbers being called, and which also causes wasteful delays and time consuming work by the operators in telephone exchanges looking up wrongly called numbers for subscribers who have erroneously read the directory.

The specific dimensions hereinabove given are not to be considered limitations. They represent the dimensions that have been found to be satisfactory in actual use. In such instruments the stripes 3, 18 and 21 have been imprinted in red, which clearly distinguishes in color as well as in shade or value from the tints in the areas extending outwardly of the respective pairs of stripes.

I claim:

1. An instrument for use in isolating any one row of symbols from other rows thereof imprinted on a planar sheet with said rows equally spaced from each other in parallel side-by-side relation comprising:

a. a strip of flexible, transparent material of uniform thickness having a first straight edge extending longitudinally thereof and planar opposite surfaces;

b. said strip having a straight, clear band parallel with and spaced from said one edge of a width slightly greater than the maximum height of the symbols of said rows and less than the distance between alternate rows for observation of one of said rows through said band when said strip is positioned flat on such sheet with a row of said symbols below said band;

c. said strip including one continuous portion thereof respectively extending between said band and said one edge and a second continuous portion extending away from said band at the side thereof opposite said one edge;

d. a planar, transparent, light, uniform tint spaced between and parallel with said planar opposite surfaces within and substantially coextensive with said areas distinguishing said band from the said areas; and e. a pair of parallel stripes spaced within said strip and respectively positioned along opposite longitudinally extending edges of said band, said stripes being of a deep value relative to the value of said tints to define junctures between said tint and said band, whereby any one of said rows of symbols when positioned below said band will be clearly visually isolated from adjacent bands while the symbols in the adjacent bands may be read when said strip is positioned flat on said strip with a row of said symbols below said band.

2. In an instrument as defined in claim 1:

f. said stripes being of equal width and which width is a relatively small fractional part of the width of said band; and g. said first portion being relatively narrow to facilitate locating the row of symbols to be positioned below said band; and h. said second portion being substantially wider than said first portion to provide a finger engaging surface for moving said strip on said sheet transversely of said rows free from interference with the sight of the operator.

3. In an instrument as defined in claim 2:

i. said strip having a second straight edge parallel with and opposite to said first edge;

j. a second clear band in said strip spaced from said second edge approximately the same distance said first mentioned band is spaced from said first edge;

k. said tint in said second portion extending substantially to one edge of said band and a corresponding tint being within said strip between said second band and said second edge;

l. said second band being double the width of said first band to enable isolating any one of conventional double-spaced rows of conventionally printed symbols when one of such rows is positioned below said second band;

m. a pair of parallel stripes spaced within said strip respectively positioned along opposite longitudinally extending edges of said band, said stripes having substantially the same value and width as the value and width of said first mentioned stripes.

4. In an instrument as defined in claim 1:

a. the tinting within said portions and said stripes being midway between the planar sides of said strip whereby a row of symbols when positioned below said band will be viewed with equal clarity irrespective of which of said opposite planar surfaces is against said sheet.

* * * * *